United States Patent
Lee et al.

(10) Patent No.: US 11,280,889 B2
(45) Date of Patent: Mar. 22, 2022

(54) DISTANCE MEASURING SENSOR ASSEMBLY AND ELECTRONIC DEVICE HAVING SAME

(71) Applicant: MOSTOP CO., LTD., Hwaseong-si (KR)

(72) Inventors: Seung Soo Lee, Anyang-si (KR); Won Kyu Lim, Suwon-si (KR); Kyung Eui Hong, Anseong-si (KR); Yi Hyun Nam, Suwon-si (KR); Keun Won Lee, Seongnam-si (KR)

(73) Assignee: MOSTOP CO., LTD., Hwaseong-si (KR)

( * ) Notice: Subject to any disclaimer, the term of this patent is extended or adjusted under 35 U.S.C. 154(b) by 732 days.

(21) Appl. No.: 16/092,161

(22) PCT Filed: Apr. 6, 2017

(86) PCT No.: PCT/KR2017/003776
§ 371 (c)(1),
(2) Date: Oct. 8, 2018

(87) PCT Pub. No.: WO2017/176070
PCT Pub. Date: Oct. 12, 2017

(65) Prior Publication Data
US 2019/0154813 A1  May 23, 2019

(30) Foreign Application Priority Data

Apr. 7, 2016 (KR) .................. 10-2016-0043016
Aug. 26, 2016 (KR) .................. 10-2016-0109450
Apr. 5, 2017 (KR) .................. 10-2017-0044263

(51) Int. Cl.
*G01S 7/4865* (2020.01)
*G01S 7/481* (2006.01)
(Continued)

(52) U.S. Cl.
CPC .............. *G01S 7/4865* (2013.01); *G01C 3/08* (2013.01); *G01S 7/4813* (2013.01);
(Continued)

(58) Field of Classification Search
CPC .... G01S 7/4865; G01S 7/4813; G01S 7/4814; G01S 7/4816; G01S 17/08; G01S 17/48; G01C 3/08
See application file for complete search history.

(56) References Cited

U.S. PATENT DOCUMENTS 4,313,654 A * 2/1982 Matsui ................ G02B 7/32
356/3.06
4,397,547 A * 8/1983 Grassi ................ G02B 5/04
356/3.14
(Continued)

FOREIGN PATENT DOCUMENTS

JP   2005-017382   1/2005
JP   2009-099345   5/2009
(Continued)

OTHER PUBLICATIONS

International Search Report dated Jul. 14, 2017, in International Application No. PCT/KR2017/003776 (with English Translation).

*Primary Examiner* — Luke D Ratcliffe
(74) *Attorney, Agent, or Firm* — H.C. Park & Associates, PLC

(57) ABSTRACT

A distance measuring sensor assembly and an electronic device having the same, the sensor assembly including: a housing; a first lens provided at an upper part of the housing; a sensor module provided inside the housing, and having a light emitting part aligned with the first lens and emitting light toward an object, and a light receiving part disposed to be adjacent to the light emitting part. A reception part is provided at the upper part of the housing and spaced apart from the first lens. The light reflected from the object enters
(Continued)

through the reception part. A second lens is provided at a lower part of the reception part and refracts the light entering from the reception part, and an optical waveguide part coupled to the second lens is used to guide the light having transmitted from the second lens to the light receiving part.

15 Claims, 15 Drawing Sheets

(51) Int. Cl.
    *G01S 17/08*           (2006.01)
    *G01C 3/08*            (2006.01)
    *G01S 17/48*           (2006.01)

(52) U.S. Cl.
    CPC .......... *G01S 7/4814* (2013.01); *G01S 7/4816* (2013.01); *G01S 17/08* (2013.01); *G01S 17/48* (2013.01)

(56) References Cited

U.S. PATENT DOCUMENTS

| | | | |
|---|---|---|---|
| 6,154,278 | A | 11/2000 | Ito et al. |
| 6,972,834 | B1* | 12/2005 | Oka ........................ G01S 7/4813 |
| | | | 356/3.01 |
| 8,902,410 | B2 | 12/2014 | Wada |
| 9,312,402 | B2* | 4/2016 | Tu ............................ H01L 31/18 |
| 2004/0001193 | A1 | 1/2004 | Takaoka |
| 2004/0257555 | A1 | 12/2004 | Takaoka et al. |
| 2013/0135605 | A1* | 5/2013 | Wada ........................ G01C 3/00 |
| | | | 356/4.01 |
| 2015/0097947 | A1* | 4/2015 | Hudman ................. G01S 17/89 |
| | | | 348/136 |

FOREIGN PATENT DOCUMENTS

| | | |
|---|---|---|
| JP | 2013-113666 | 6/2013 |
| KR | 10-0141445 | 7/1998 |

* cited by examiner

DISTANCE MEASURING SENSOR ASSEMBLY AND ELECTRONIC DEVICE HAVING SAME

CROSS REFERENCE TO RELATED APPLICATIONS

This application is the National Stage Entry of International Patent Application No. PCT/KR2017/003776, filed on Apr. 6, 2017, and claims priority from and the benefit of Korean Patent Application No. 10-2016-0043016, filed on Apr. 7, 2016, Korean Patent Application No. 10-2016-0109450, filed on Aug. 26, 2016, and Korean Patent Application No. 10-2017-0044263, filed on Apr. 5, 2017, all of which are hereby incorporated by reference for all purposes as if set forth herein.

BACKGROUND

Field

Exemplary embodiments of the present invention relates to a distance measuring sensor assembly and an electronic device having the same, and more particularly, to a distance measuring sensor assembly using a time of flight (TOF) method which improves accuracy of measuring a distance, and an electronic device having the same.

Discussion of the Background

A distance measuring sensor is a device which measures a distance between two points.

The distance measuring sensor includes an ultrasonic distance measuring sensor configured to measure a distance using ultrasonic waves and an optical distance measuring sensor configured to measure a distance using light sources.

First, the ultrasonic distance measuring sensor measures the distance to an object by receiving a reflective wave reflected from the object after transmitting the ultrasonic wave toward the object. However, such an ultrasonic distance measuring sensor has a problem in that the distance to the object may not be measured when the object is made of a sound absorbing material such as a sponge or Styrofoam®.

Next, the optical distance measuring sensor measures the distance between two points using various light sources such as infrared ray or natural light.

Such an optical distance measuring sensor may be largely divided into two methods according to a measuring method. Specifically, there are a triangulation method which measures a distance by calculating a movement of a focal distance according to a change in the distance to an object, and a time of flight (TOF) method which measures a distance by calculating time taken to reflect and return after emitting light toward the object.

FIG. 1 is an exemplary view illustrating an optical distance measuring sensor in which the conventional triangulation method is used.

Referring to FIG. 1, an optical distance measuring sensor 10 in which the triangulation method is used includes a light emitting part 11, a first lens 12, a second lens 13, and a light receiving part 14.

The light emitting part 11 is configured to emit light toward an object T. The light emitted from the light emitting part 11 is emitted to the object T after being transmitted through the first lens 12.

The light receiving part 14 is configured to receive the light reflected and returned from the object T. Here, the second lens 13 guides the light reflected from the object T to the light receiving part 14.

Here, when a distance between the light emitting part 11 and the object T is varied, a path of the light guided to the second lens 13 is changed, and a focal distance corresponding thereto is moved. As described above, the optical distance measuring sensor 10 measures the distance to the object T by calculating the movement of the focal distance.

However, the optical distance measuring sensor 10 in which the triangulation method is used is complicated in a structure of an optical system and is vulnerable to external light.

FIG. 2 is an exemplary view illustrating an optical distance measuring sensor in which the conventional TOF method is used.

Referring to FIG. 2, an optical distance measuring sensor 20 in which the TOF method is used includes a light emitting part 21 and a light receiving part 22. The optical distance measuring sensor 20 measures a distance to an object T by calculating time taken for light emitted from the light emitting part 21 to be reflected from the object T and to be guided to the light receiving part 22.

The optical distance measuring sensor 20 in which the TOF method is used may be miniaturized, and thus the optical distance measuring sensor 20 is applicable to various electronic devices such as robot cleaners and refrigerators.

However, the optical distance measuring sensor 20 in which the TOF method is used is problematic in that errors are frequently generated when measuring the distance due to a structure in which the light emitting part 21 and the light receiving part 22 are disposed to be adjacent to each other.

For example, when the optical distance measuring sensor 20 is mounted on the robot cleaner, the light emitted from the light emitting part 21 is transmitted through a window (not shown) configured to protect the optical distance measuring sensor 20 from the outside and is emitted to the object T. However, the light receiving part 22 disposed to be adjacent to the light emitting part 21 receives the light reflected from the window, not the light reflected from the object T, thereby causing an error in measuring the distance to the object. Therefore, there is a problem in that the distance to the object T may not be accurately measured.

SUMMARY

The present invention is directed to providing a distance measuring sensor assembly using a time of flight (TOF) method which improves accuracy of measuring a distance and an electronic device having the same.

One aspect of the present invention provides a distance measuring sensor assembly including: a housing; a first lens provided on an upper part of the housing; a sensor module which is provided inside the housing and includes a light emitting part aligned with the first lens and emitting light toward an object and a light receiving part disposed to be adjacent to the light emitting part; a reception part which is provided on the upper part of the housing and spaced apart from the first lens, and into which light reflected from the object is introduced; a second lens which is provided under the reception part and refracts the light introduced from the reception part; and an optical waveguide part which is coupled to the second lens and guides the light transmitted from the second lens to the light receiving part.

In one embodiment of the present invention, the first lens may be configured to adjust a divergence angle of the light emitted from the light emitting part.

In one embodiment of the present invention, the first lens may include: a light adjusting member configured to adjust the light emitted from the light emitting part to parallel light; and a divergence angle adjusting member provided on the light adjusting member and configured to spread the parallel light transmitted from the light adjusting member to adjust a divergence angle of the light.

In one embodiment of the present invention, mountains and valleys may be alternately formed on an upper surface of the divergence angle adjusting member.

In one embodiment of the present invention, at least one of the first lens, the second lens, and the optical waveguide part may be configured to transmit or reflect only light of a specific wavelength.

In one embodiment of the present invention, the second lens may be configured to be integrally coupled to the reception part.

In one embodiment of the present invention, an upper surface of the second lens may be inclined upward toward the first lens.

In one embodiment of the present invention, the second lens may be formed with a spherical lens or an aspherical lens.

In one embodiment of the present invention, the second lens may be formed with a cylindrical lens.

In one embodiment of the present invention, an inner surface of the optical waveguide part may be configured to allow total reflection.

In one embodiment of the present invention, the second lens and the optical waveguide part may be configured to focus the light introduced into the reception part on the light receiving part.

In one embodiment of the present invention, the optical waveguide part may include: a body part which forms an exterior of the optical waveguide part and has an inside on which a path part through which the light is moved is formed; a first reflective part which is provided on one side of the body part and reflects the light transmitted from the second lens; and a second reflective part which provided on the other side of the body part and faces the first reflective part to transmit the light reflected from the first reflective part to the light receiving part.

In one embodiment of the present invention, the first reflective part may be provided under the second lens and may be configured to reflect the light transmitted from the second lens to the second reflective part.

In one embodiment of the present invention, the first and second reflective parts may be formed in the shape of a concave cylinder, and focal lines formed by the first and second reflective parts are perpendicular to each other on the light receiving part to form a focus.

In one embodiment of the present invention, a distance from the first reflective part to the second reflective part and a distance from the second reflective part to the light receiving part may be in relation with the following Equations 1 and 2. Here, Equation 1 is $0.8 \times f1 \leq d1 + d2 \leq 1.2 \times f1$, and Equation 2 is $0.8 \times f2 \leq d2 \leq 1.2 \times f2$, where a focal distance of the first reflective part is f1, a focal distance of the second reflective part is f2, the distance from the first reflective part to the second reflective part is d1, and the distance from the second reflective part to the light receiving part is d2.

In one embodiment of the present invention, the first and second reflective parts may be formed in a spherical shape or an aspherical shape.

In one embodiment of the present invention, the body part may be narrowed in width from the first reflective part toward the second reflective part.

Another aspect of the present invention provides an electronic device provided with the distance measuring sensor assembly.

Effects of a distance measuring sensor assembly according to the present invention and an electronic device having the same will be described as follows.

According to the present invention, since a reception part is spaced apart from a first lens by a predetermined distance, light reflected from an object existing within a predetermined distance range from the first lens can be prevented from being guided to the reception part.

For example, when the distance measuring sensor assembly is mounted on a robot cleaner, since the reception part and the first lens are disposed to be spaced apart from each other at predetermined intervals in the distance measuring sensor assembly, the light reflected from a window can be prevented from being guided to the reception part. Thus, the distance measuring sensor assembly can accurately measure the distance to the object.

According to the present invention, a second lens and an optical waveguide part are configured to focus the light introduced into the reception part and transmit the light to a light receiving part. That is, the second lens and the optical waveguide part focus the light introduced into the reception part such that a focus of the light introduced into the reception part is formed on the light receiving part. Thus, the distance measuring sensor assembly can accurately measure the distance to the object. Here, a first reflective part and a second reflective part are provided in the optical waveguide part so that the light introduced into the reception part can be effectively focused on the light receiving part.

Further, the optical waveguide part provided with the first and second reflective parts is configured to enable total reflection so that the light introduced into the reception part can be transmitted to the light receiving part with a minimized optical loss. In addition, the optical waveguide part narrows in width toward the second reflective part on the basis of the first reflective part so that a focusing efficiency of the light transmitted to the light receiving part can be increased. Thus, the distance measuring sensor assembly can accurately measure the distance to the object.

Effects of the present invention are not limited to the above-mentioned effects, and it should be understood that the present invention includes all effects inferable from the detailed description of the present invention or the constitution of the invention described in the claims.

DESCRIPTION OF THE DRAWINGS

The accompanying drawings, which are included to provide a further understanding of the inventive concept, and are incorporated in an constitute a part of this specification illustrate exemplary embodiments of the inventive concept, and, together with the description, serve the explain principles of the inventive concepts.

DETAILED DESCRIPTION

Figure 1:
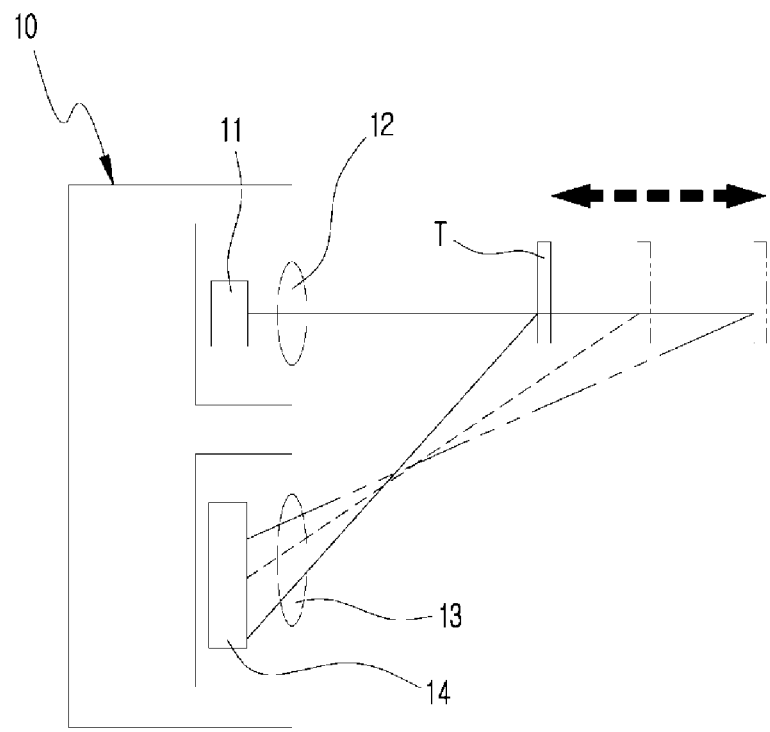
FIG. 1 is an exemplary view illustrating an optical distance measuring sensor in which a conventional triangulation method is used.
Figure 2:
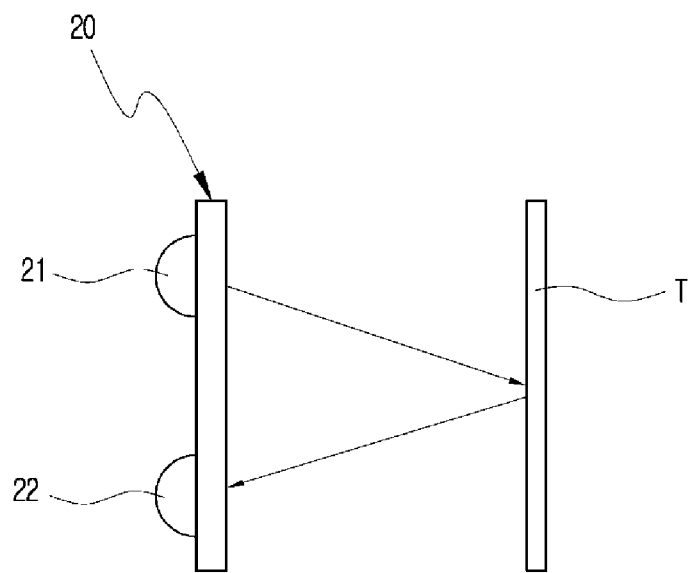
FIG. 2 is an exemplary view illustrating an optical distance measuring sensor in which a conventional time of flight (TOF) method is used.

Hereinafter, the present invention will be described with reference to the accompanying drawings. However, embodiments of the present invention may be implemented in several different forms, and are not limited to embodiments described herein. Further, elements which do not relate to the detail description are not shown in the drawings to clearly describe the present invention, and similar elements in the following description are designated by similar reference numerals.

In addition, throughout this specification, when a part is referred to as being "connected" to another part, the reference includes the part being "directly connected" to the other part and the part being "indirectly connected" to the other part via an intervening member. Also, when a certain part "includes" a certain component, this description does not exclude the inclusion of other components unless described otherwise, and other components may in fact be included.

Hereinafter, embodiments of the present invention will be described in detail with reference to the accompanying drawings.

Figure 3:
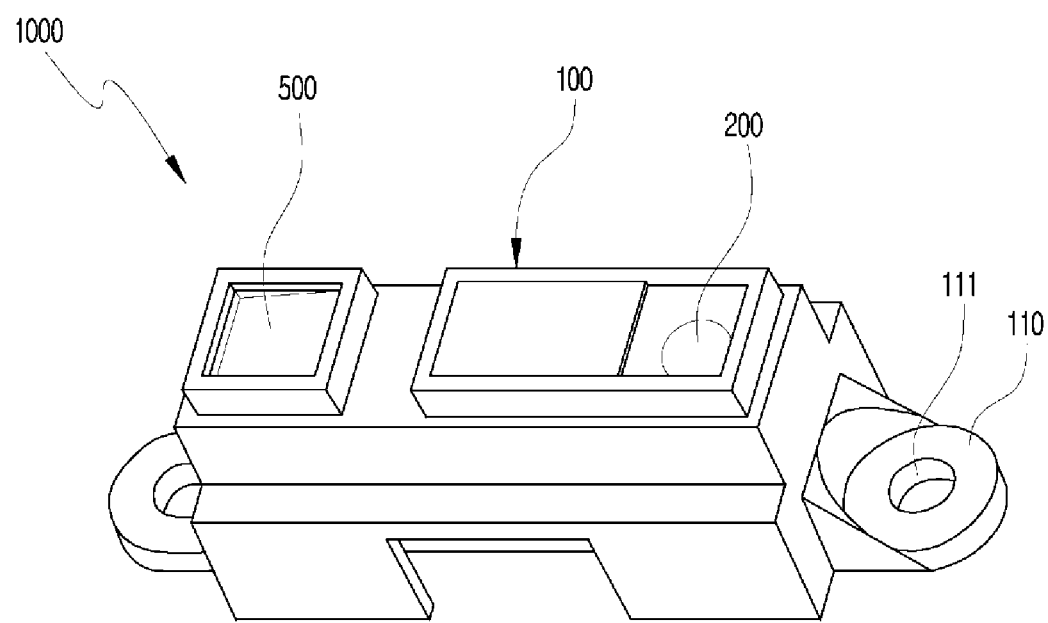
FIG. 3 is a perspective view of a distance measuring sensor assembly according to a first embodiment of the present invention.
Figure 4:
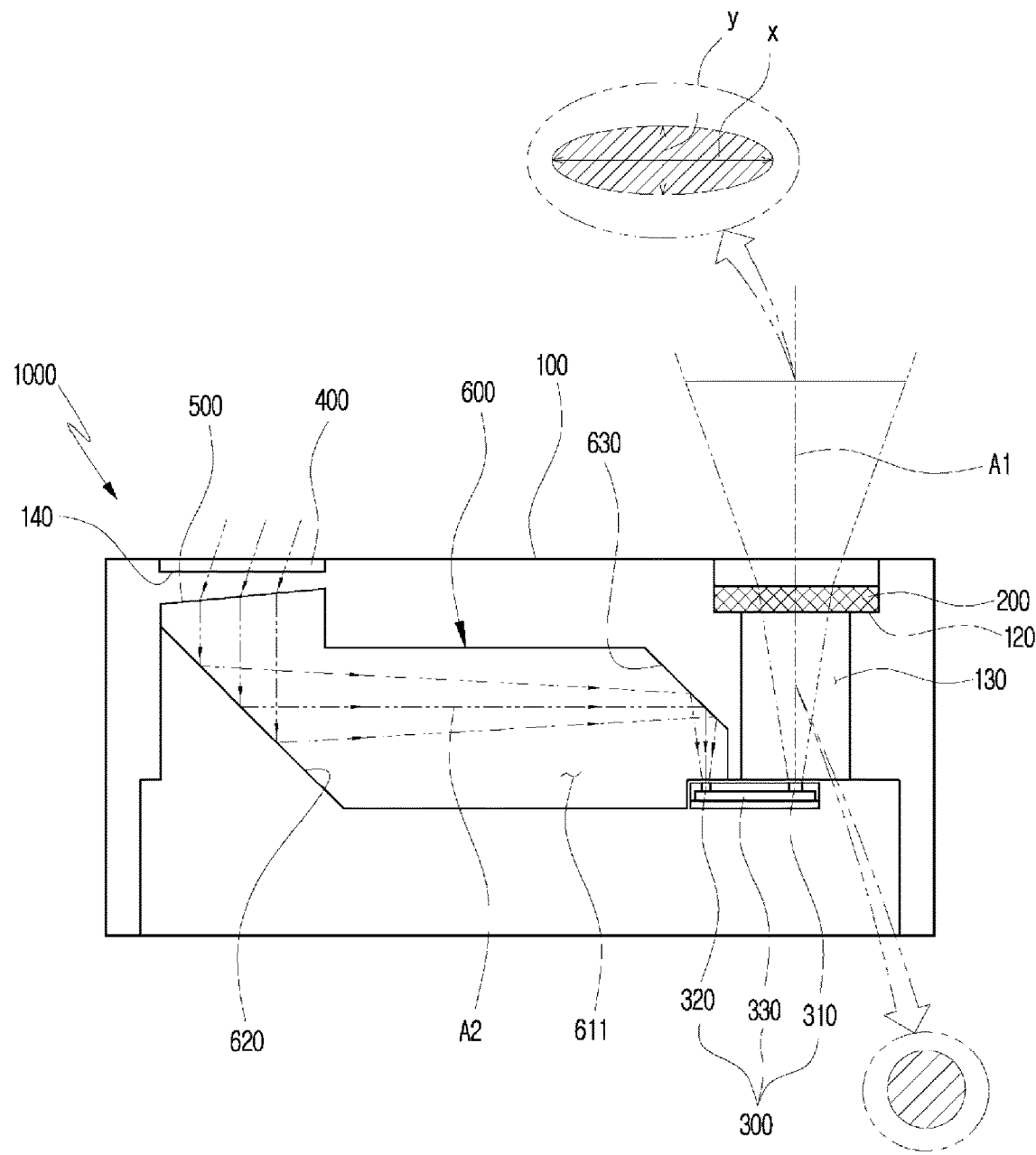
FIG. 4 is a schematic exemplary view of the distance measuring sensor assembly according to the first embodiment of the present invention.
Figure 5:
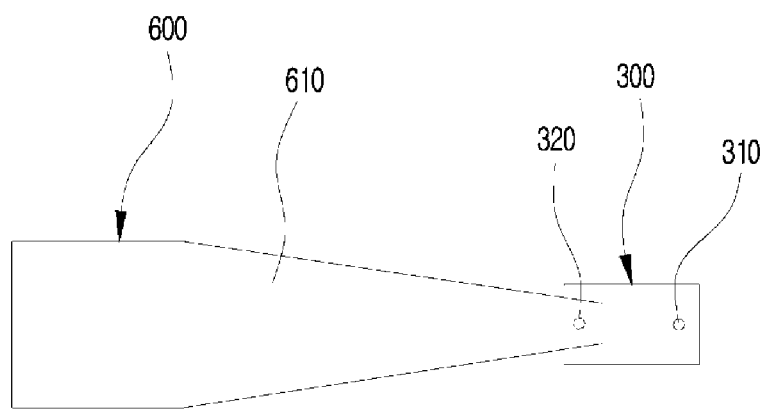
FIG. 5 is an exemplary view of an optical waveguide part according to the first embodiment of the present invention, viewed from above.
Figure 6:
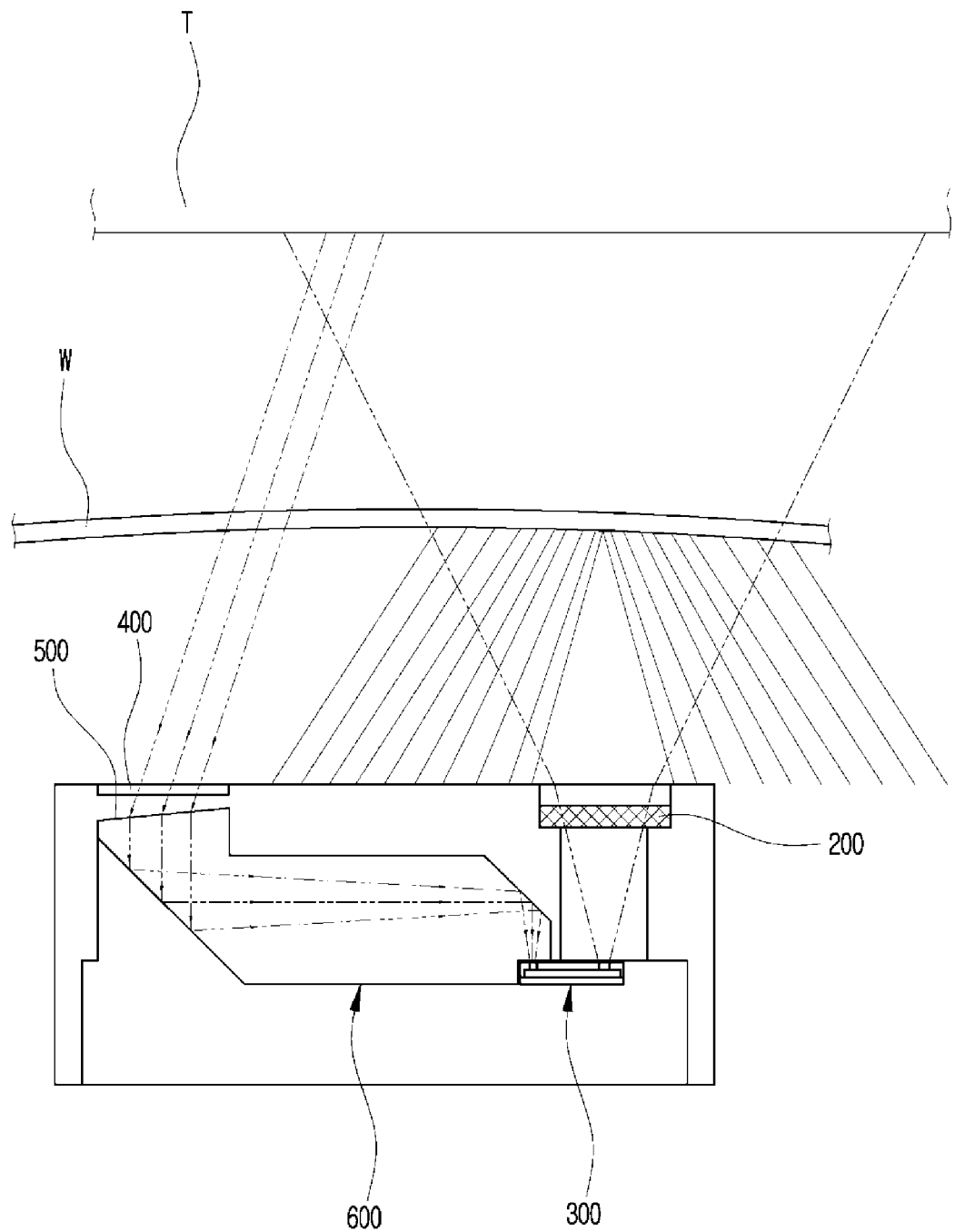
FIG. 6 is a view illustrating an operation state of the distance measuring sensor assembly according to the first embodiment of the present invention.

FIG. 3 is a perspective view of a distance measuring sensor assembly according to a first embodiment of the present invention, FIG. 4 is a schematic exemplary view of the distance measuring sensor assembly according to the first embodiment of the present invention, FIG. 5 is an exemplary view of an optical waveguide part according to the first embodiment of the present invention, viewed from above, and FIG. 6 is a view illustrating an operation state of the distance measuring sensor assembly according to the first embodiment of the present invention.

As shown in FIGS. 3 to 6, a distance measuring sensor assembly 1000 includes a housing 100, a first lens 200, a sensor module 300, a reception part 400, a second lens 500, and an optical waveguide part 600.

The housing 100 forms an exterior of the distance measuring sensor assembly 1000. The sensor module 300, the second lens 500 and the optical waveguide part 600 are provided inside the housing 100, and the housing 100 protects various components provided therein from the outside.

Coupling parts 110 are provided on both sides of the housing 100 and coupling holes 111 are formed in the coupling parts 110. Accordingly, a worker may use a coupling member such as a bolt to couple the distance measuring sensor assembly 1000 to various electronic devices. The housing 100 may be made of various materials such as a metal or synthetic resin.

A first seating part 120 is formed on an upper surface of the housing 100.

The first lens 200 is seated on the first seating part 120, and the first lens 200 is aligned with a light emitting part 310. Here, the alignment of the first lens 200 and the light emitting part 310 may be configured to be aligned with respect to a first optical axis A1 or may be a mechanical alignment between the first lens 200 and the light emitting part 310.

Also, a light guide hole 130 is formed on a lower part of the first seating part 120 so that light emitted from the light emitting part 310 may be guided to the first lens 200 through the light guide hole 130. Here, the light guide hole 130 is configured to block the light emitted from the light emitting part 310 from being directly transmitted to a light receiving part 320.

Meanwhile, the first lens 200 is configured to selectively adjust a divergence angle of the light emitted from the light emitting part 310 while transmitting the light which is radially emitted from the light emitting part 310. The first lens 200 may be formed with a spherical lens or an aspherical lens.

The first lens 200 selectively adjusts a length ratio of an X length x and a Y length y of the light moving along the first optical axis A1. Here, the X length x and Y length y of the light are cross sections of the light at any point on the first optical axis A1.

For example, the light guided from the light emitting part 310 to the first lens 200 has a circular cross-section with respect to the first optical axis A1. However, the light emitted to an object T after being transmitted through the first lens 200 may have an elliptical cross-section with respect to the first optical axis A1. Here, the cross section of the light transmitted through the first lens 200 with respect to the first optical axis A1 is not necessarily limited to an elliptical shape and may be variously changed according to a shape of the first lens 200.

When the distance measuring sensor assembly 1000 is mounted on a robot cleaner, the first lens 200 selectively adjusts the light emitted toward a floor surface on which the robot cleaner is moved. Accordingly, the light reflected from the floor surface on which the robot cleaner is moved may be prevented from being introduced into the reception part 400. Thus, an operation error generated by recognizing the floor surface as the object by the robot cleaner may be blocked in advance.

As described above, the first lens 200 controls a sensing range of the object T by selectively adjusting the divergence angle of the light emitted from the light emitting part 310.

Here, the distance measuring sensor assembly 1000 may be mounted on various electronic devices in addition to the robot cleaner, but for the convenience of explanation, the robot cleaner will be described as an example of an electronic device to be described below.

Meanwhile, a second seating part 140 spaced apart from the first seating part 120 by a predetermined length is formed on the upper surface of the housing 100. The reception part 400 is seated on and coupled to the second seating part 140 so that the light reflected from the object T may be transmitted to the optical waveguide part 600 through the reception part 400.

Here, since the reception part 400 is spaced apart from the first lens 200 by the predetermined length, the light reflected from the object existing in a certain range from the first lens 200 may be prevented from being introduced into the reception part 400. For example, the reception part 400 is disposed in the housing 100 such that the light reflected from a window W provided in the robot cleaner is not introduced into the reception part 400.

The second lens 500 is provided under the reception part 400.

An upper surface of the second lens 500 is inclined upward toward the first lens 200. Therefore, the light introduced from the reception part 400 is transmitted through the second lens 500 and is refracted to the optical waveguide part 600 provided under the second lens 500. Here, the second lens 500 is configured not to focus the light but merely to change a direction of the light through the refraction. The second lens 500 may also be configured to be integrally coupled to the reception part 400.

Here, the second lens 500 may selectively transmit only light of a specific wavelength. For example, the second lens 500 may selectively transmit only an infrared ray (IR). In this case, the light emitting part 310 emits the IR toward the object T, and the light receiving part 320 receives only the IR reflected from the object T, thereby measuring a distance to the object T. In this case, an influence of external light may be minimized in the distance measuring sensor assembly 1000. Further, the first lens 200 may also be configured to selectively transmit only light of a specific wavelength, like the second lens 500.

Meanwhile, one end of the optical waveguide part 600 is coupled to the second lens 500, and an inner side surface of the optical waveguide part 600 is configured to allow total reflection. Here, the total reflection means that light is reflected 100% at a boundary when the light proceeds from a medium having a great refractive index to a medium having a small refractive index and an incident angle is greater than a critical angle. Accordingly, since the optical waveguide part 600 is configured to allow the total reflection with respect to the light introduced through the reception part 400, the light introduced into the reception part 400 may be transmitted to the light receiving part 320 with a minimal optical loss. Here, the optical waveguide part 600 may be configured to selectively reflect only light of a specific wavelength.

The optical waveguide part 600 includes a body part 610, a first reflective part 620 and a second reflective part 630. The body part 610 forms an exterior of the optical waveguide part 600 and has an inside on which a path part 611 through which the light is moved is formed. Here, an inner side surface of the body part 610 is configured to allow the total reflection.

Also, the body part 610 is configured to be narrowed in width from the first reflective part 620 toward the second reflective part 630. Thus, the optical waveguide part 600 may increase the focusing efficiency of the light guided to the light receiving part 320.

The first reflective part 620 is provided on one side of the body part 610. The first reflective part 620 is configured to guide the light transmitted from the second lens 500 to the second reflective part 630. Here, the first reflective part 620 is provided on a lower side of the second lens 500, and is inclined in a direction in which the sensor module 300 is disposed toward downward. Accordingly, the light transmitted from the second lens 500 to the first reflective part 620 may be reflected to the second reflective part 630.

The second reflective part 630 is provided on the other side of the body part 610 and configured to face the first reflective part 620. The second reflective part 630 guides the light transmitted from the first reflective part 620 to the light receiving part 320.

Here, the first and second reflective parts 620 and 630 may have various shapes such that a focus of the light transmitted from the second lens 500 is formed on the light receiving part 320. For example, a reflective surface of the first reflective part 620 may be formed in a spherical shape, and a reflective surface of the second reflective part 630 may be formed in a plane surface. In this case, the first reflective part 620 formed in the spherical shape focuses the light transmitted from the second lens 500. Hereinafter, for the convenience of explanation, an optical axis passing through the second lens 500, the first reflective part 620, and the second reflective part 630 will be described by referring to a second optical axis A2.

As described above, the first reflective part 620 may be formed in the spherical shape so that the focus of the light transmitted from the second lens 500 is formed on the light receiving part 320.

Alternatively, both the first and second reflective parts 620 and 630 may be formed in the spherical shape. In this case, the shapes of the first and second reflective parts 620 and 630 may be adjusted such that the light transmitted from the second lens 500 is primarily focused on the first reflective part 620 and secondarily focused on the second reflective part 630 to form the focus of the light on the light receiving part 320.

In addition, the first and second reflective parts 620 and 630 may be adjusted to have an aspherical shape so that the focus of the light transmitted from the second lens 500 is formed on the light receiving part 320. Here, the aspherical surface collectively refers to a curved surface that is not the spherical surface and may be a curved surface of degree 2 or higher such as a paraboloid, a hyperboloid, an ellipsoid, or the like.

In addition, the first and second reflective parts 620 and 630 may be configured to be adjustable to various shapes such that the focus of the light transmitted from the second lens 500 is formed on the light receiving part 320.

Further, the sensor module 300 includes the light emitting part 310, the light receiving part 320, and a base substrate 330.

The light emitting part 310 is aligned with the first lens 200 and is configured to emit the light toward the object T.

The light receiving part 320 is disposed to be adjacent to the light emitting part 310 and receives the reflected light emitted from the light emitting part 310 to the object T to measure the distance to the object T. The base substrate 330 is provided under the light emitting part 310 and the light receiving part 320, and the light emitting part 310 and the light receiving part 320 are electrically connected to the base substrate 330.

The sensor module 300 may be a sensor module configured to measure the distance through a time of flight (TOF) method. That is, the sensor module 300 measures the distance from the sensor module 300 to the object T using information on time in which the light emitting part 310 emits the light toward the object T and on time in which the light receiving part 320 receives the light reflected from the object T.

The light emitting part 310 and the light receiving part 320 provided in the sensor module 300 are disposed to be adjacent to the base substrate 330. This is to prevent a problem in which a value of the result of measuring the distance to the object T may not be provided in real time when the light emitting part 310 and the light receiving part 320 are separated from each other by a predetermined distance or more.

As described above, since the reception part 400 is formed to be spaced apart from the first lens 200, the distance measuring sensor assembly 1000 prevents the light reflected from the object existing within a predetermined distance range from being guided to the reception part 400. Thus, the distance measuring sensor assembly 1000 may accurately measure the distance to the object T.

Figure 7:
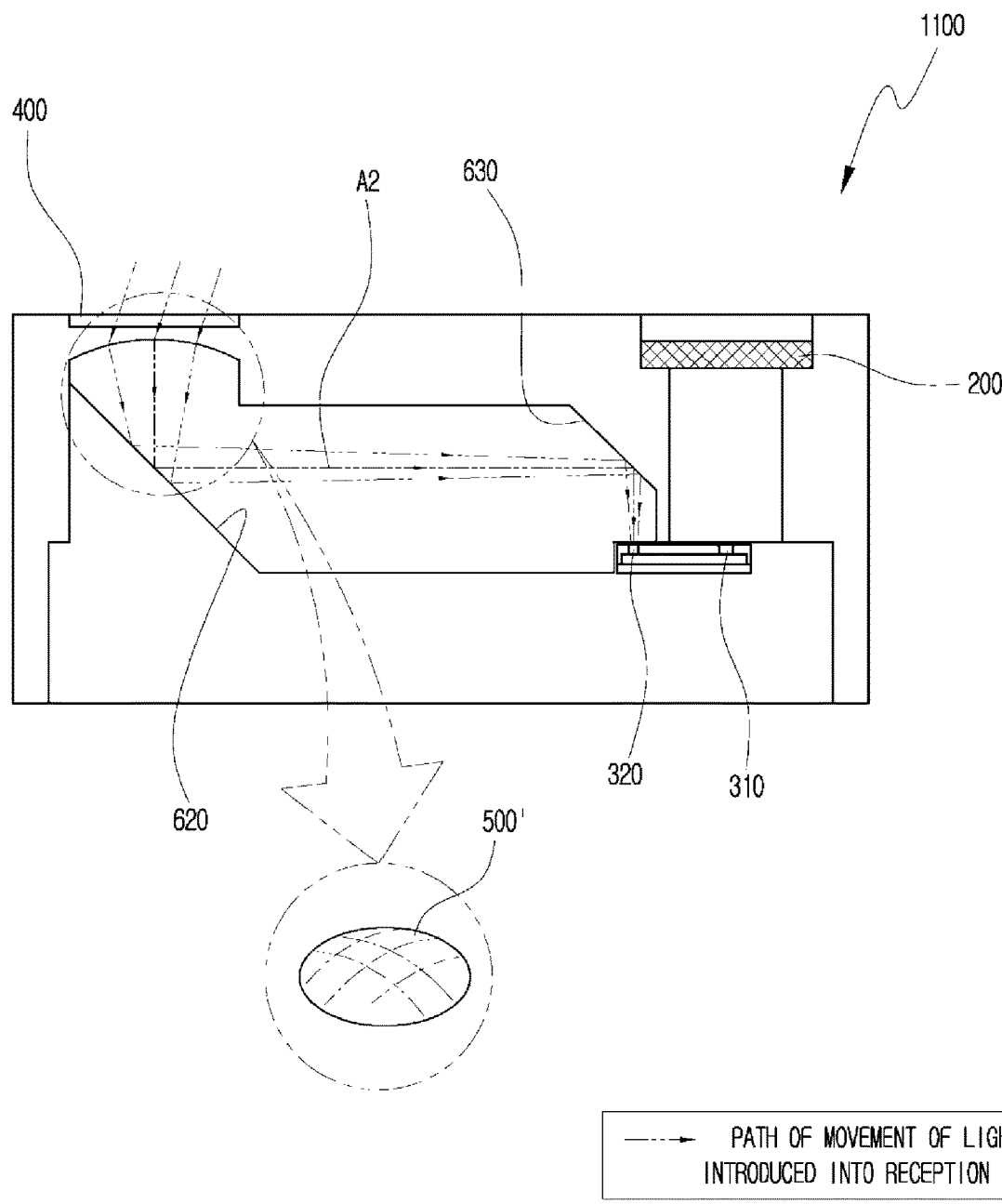
FIG. 7 is a view illustrating an operation state of a distance measuring sensor assembly according to a second embodiment of the present invention.

FIG. 7 is a view illustrating an operation state of a distance measuring sensor assembly according to a second embodiment of the present invention, and the components referred to by the same reference numerals as those shown in FIGS. 3 to 6 have the same functions, and a detailed description thereof will be omitted.

As shown in FIG. 7, a distance measuring sensor assembly 1100 according to the second embodiment differs from the distance measuring sensor assembly 1000 according to the first embodiment in that a second lens 500' is formed with the spherical lens. Thus, the second lens 500' focuses the light transmitted from the reception part 400.

Here, when the first and second reflective parts 620 and 630 are formed in a plane surface other than the curved surface, the focus of the light focused from the second lens 500' is formed on the light receiving part 320.

Alternatively, the first and second reflective parts 620 and 630 may be formed in the spherical shape or aspherical shape. In this case, the light transmitted from the reception part 400 is primarily focused on the second lens 500', the light transmitted from the second lens 500' is secondary focused on the first reflective part 620, and the light transmitted from the first reflective part 620 is thirdly focused on the second reflective part 630.

Here, the second lens 500', the first reflective part 620, and the second reflective part 630 are configured such that the focus of the light transmitted from the reception part 400 is formed on the light receiving part 320.

The first and second reflective parts 620 and 630 may be formed in various shapes other than the spherical shape or aspherical shape, and even in such a case, the focus of the light transmitted from the reception part 400 is formed on the light receiving part 320.

As described above, the second lens 500', the first reflective part 620, and the second reflective part 630 may be configured to be adjustable in various shapes such that the focus of the light transmitted from the reception part 400 is formed on the light receiving part 320.

Further, in the distance measuring sensor assembly 1100, the second lens 500' may also be formed with the aspherical lens. In this case, the second lens formed in the aspherical surface may have different light focusing as compared with the second lens 500' formed in the spherical surface, but the first and second reflective parts 620 and 630 are adjusted in various shapes such that the focus of the light transmitted from the reception part 400 is formed on the light receiving part 320.

Table 1 is a simulation result of Embodiments according to the present invention and Comparative Example.

TABLE 1

(Unit: the quantity of light introduced into the light receiving part)

| | Comparative Example | First Embodiment | Second Embodiment |
|---|---|---|---|
| 10 cm | 22 | 37 | 27 |
| 20 cm | 5 | 10 | 10 |
| 30 cm | 1 | 2 | 10 |
| 40 cm | 3 | 4 | 9 |

(On the basis of the quantity of light emitted from the light emitting part of 2,000,000)

Here, Embodiments and Comparative Example are experimental data in which the quantity of light introduced into the light receiving part 320 is measured in a case in which the quantity of light emitted from the light emitting part 310 is 2,000,000.

Table 1 shows the quantity of light guided to the light receiving part 320 in a state in which the distance between the distance measuring sensor assembly and the object T is adjusted to 10 cm, 20 cm, 30 cm, and 40 cm.

Comparative Example is a distance measuring sensor assembly in which the optical waveguide part is not provided, Embodiment 1 is the distance measuring sensor assembly 1000 according to the first embodiment of the present invention, and Embodiment 2 is the distance measuring sensor assembly 1100 according to the second embodiment of the present invention.

As shown in Table 1, it may be seen that Embodiments 1 and 2 have greater quantities of light guided to the light receiving part 320 than Comparative Example. That is, it may be seen that Embodiments 1 and 2 have better light-receiving performance than Comparative Example.

Also, it may be seen that Embodiment 2 has better light-receiving performance than Comparative Example and Embodiment 1 when the distance from the distance measuring sensor assembly to the object T exceeds 20 cm.

Figure 8:
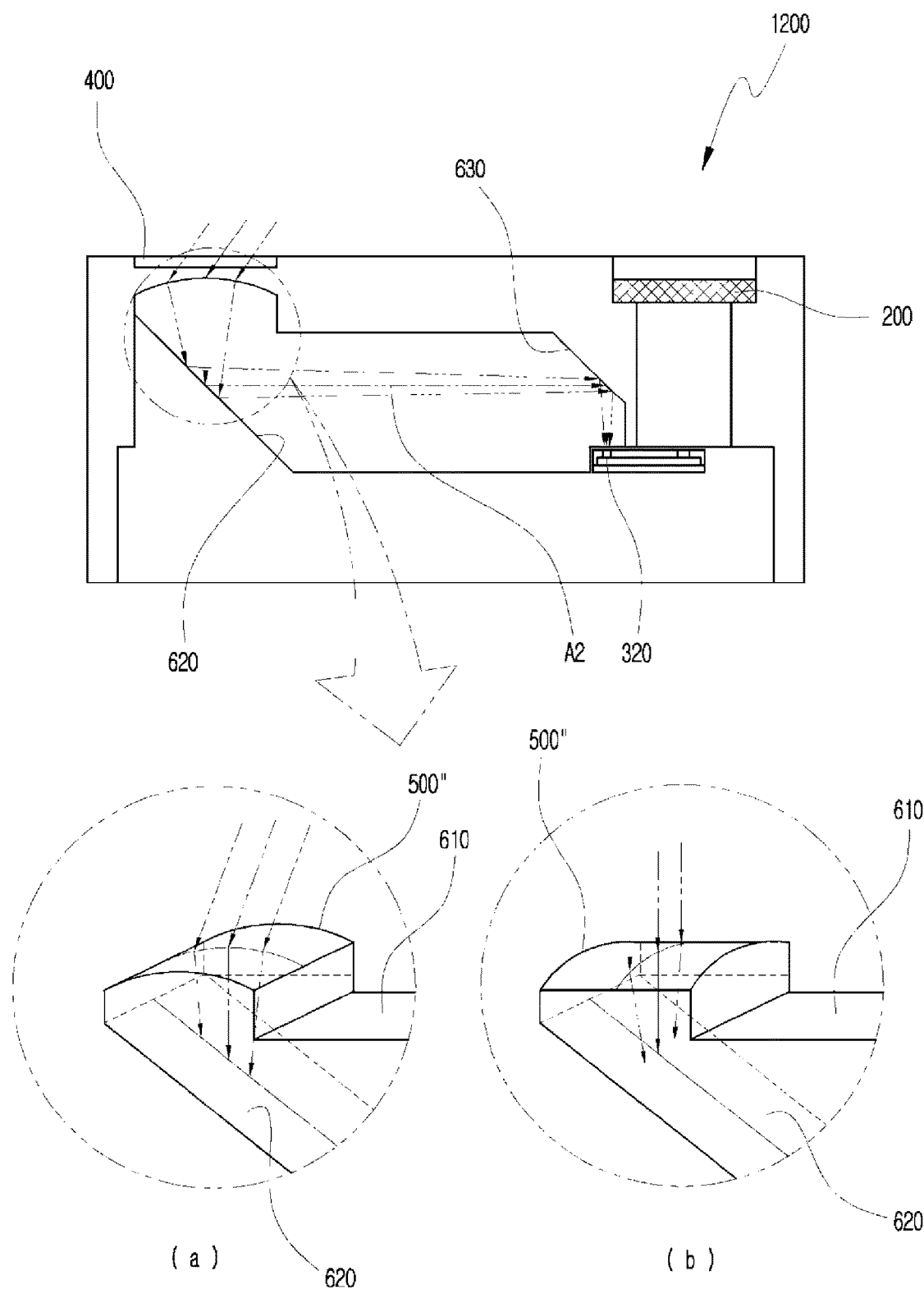
FIG. 8 is a view illustrating an operation state of a distance measuring sensor assembly according to a third embodiment of the present invention with enlarged portions (a) and (b).

FIG. 8 is a view illustrating an operation state of a distance measuring sensor assembly according to a third embodiment of the present invention, and the components referred to by the same reference numerals as those shown in FIGS. 3 to 6 have the same functions, and a detailed description thereof will be omitted.

As shown in FIG. 8, a distance measuring sensor assembly 1200 according to the third embodiment differs from the distance measuring sensor assembly 1000 according to the first embodiment in that a second lens 500" is formed with a cylindrical lens.

The cylindrical lens is a lens in which a cylindrical surface parallel to an axis of a cylinder is used as a refractive surface. Thus, the second lens 500" collects light incident on the cylindrical surface on a straight line parallel to the axis of the cylinder. That is, the second lens 500" is configured to form a focal line.

The second lens 500" of enlarged portion (a) of FIG. 8 has a shape in which the focal line is formed in a width direction of the body part 610 with respect to the light transmitted through the second lens 500", and the second lens 500" of enlarged portion (b) of FIG. 8 has a shape in which the focal line is formed in a longitudinal direction of the body part 610 with respect to the light transmitted through the second lens 500". As described above, the focal line formed by the second lens 500" may have different directions according to an arrangement of the second lens 500".

In the distance measuring sensor assembly 1200, the shapes of the first and second reflective parts 620 and 630 may be variously adjusted according to the arrangement of the second lens 500", so that the focus of the light transmitted from the reception part 400 is formed on the light receiving part 320. The details of forming the focus on the light receiving part 320 through the second lens 500", the first reflective part 620, and the second reflective part 630 have already been described and will be omitted here.

Figure 9:
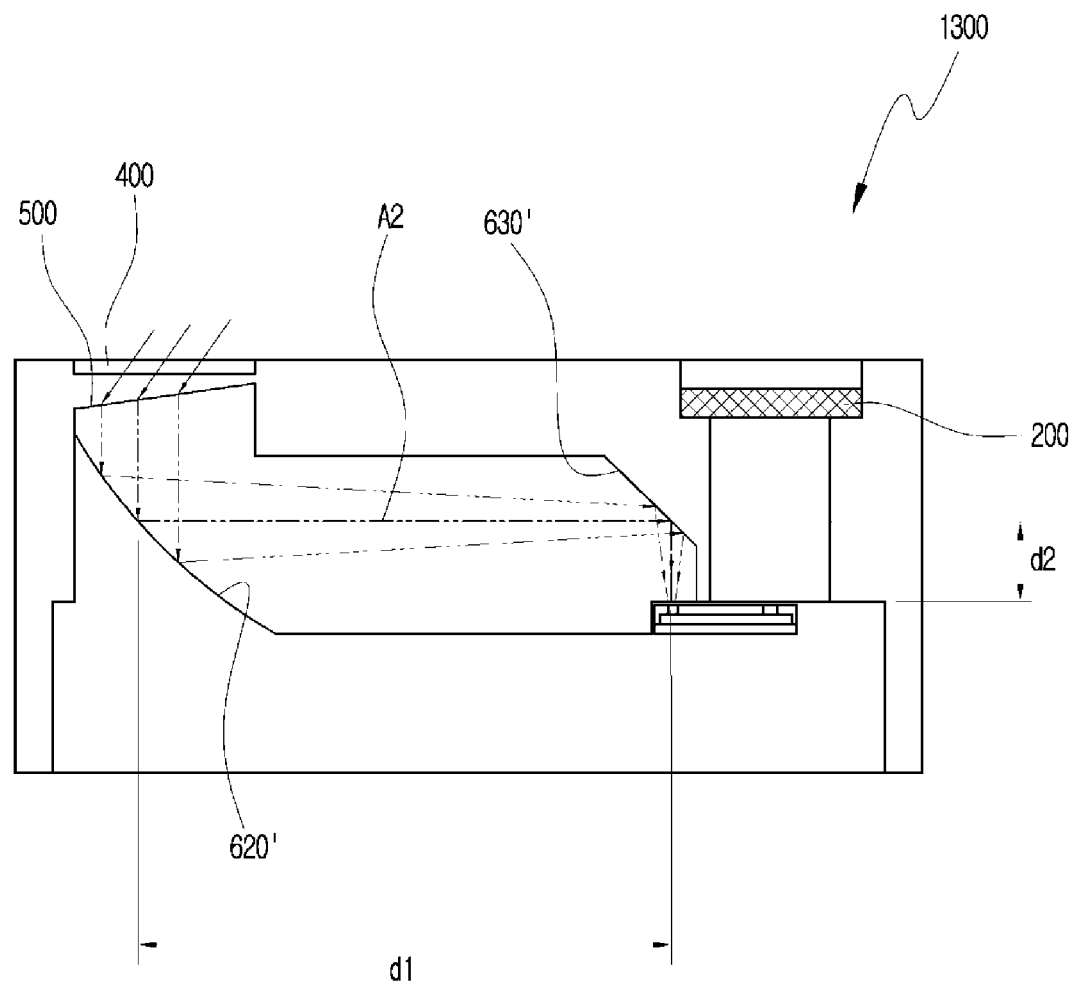
FIG. 9 is a view illustrating an operation state of a distance measuring sensor assembly according to a fourth embodiment of the present invention.
Figure 10:
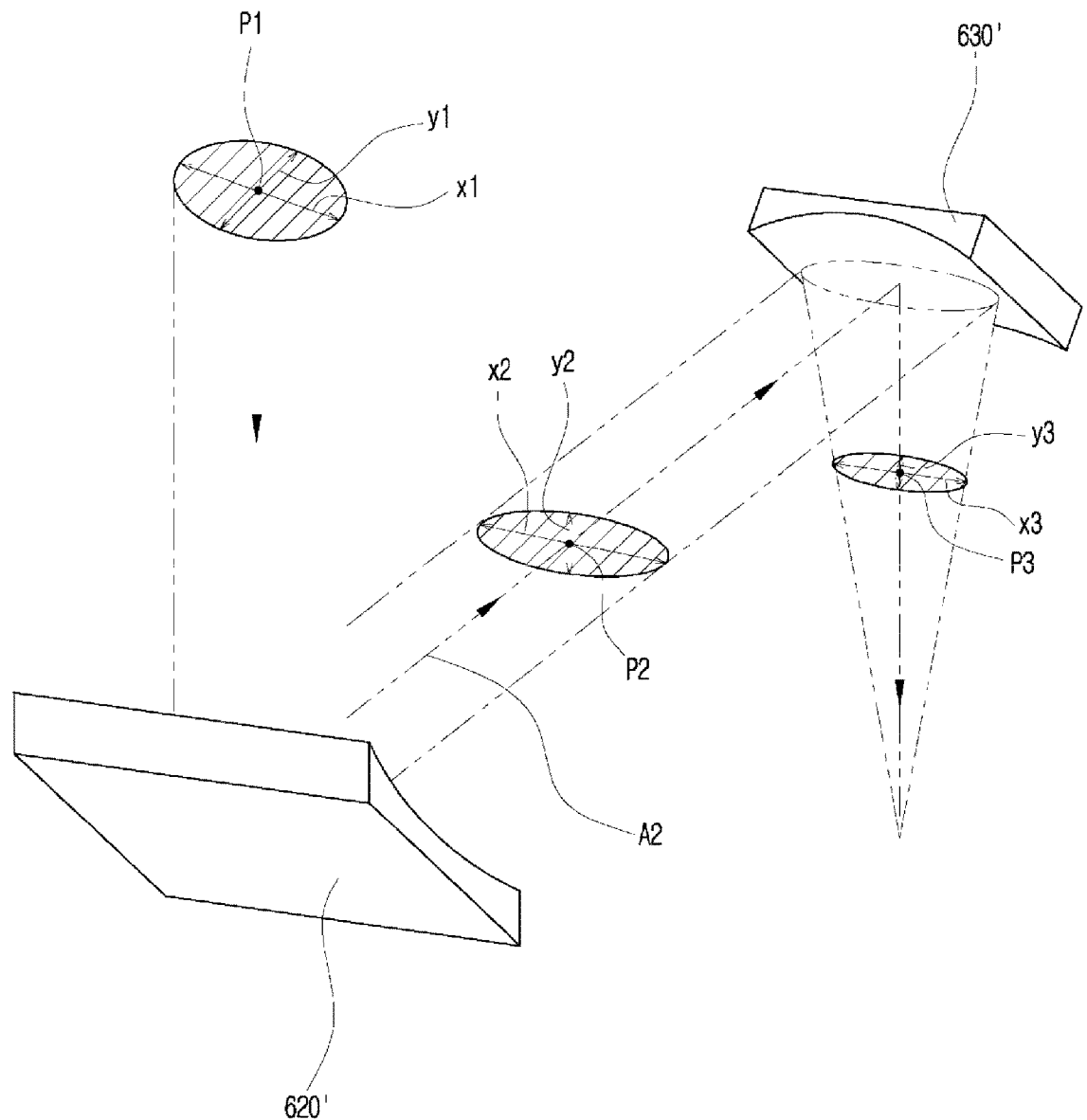
FIG. 10 is an exemplary view schematically illustrating a cross section of light guided along an optical axis direction according to the fourth embodiment of the present invention at each point.

FIG. 9 is a view illustrating an operation state of a distance measuring sensor assembly according to a fourth embodiment of the present invention, and FIG. 10 is an exemplary view schematically illustrating a cross section of light guided along an optical axis direction according to the fourth embodiment of the present invention at each point, and the components referred to by the same reference numerals as those shown in FIGS. 3 to 6 have the same functions, and a detailed description thereof will be omitted.

As shown in FIGS. 9 and 10, in a distance measuring sensor assembly 1300 according to the fourth embodiment, a first reflective part 620' and a second reflective part 630' are formed in the shape of a concave cylinder.

Here, the second lens 500 will be described as an example in which the upper surface of the second lens 500 is inclined upward toward the first lens 200 like in the first embodiment. The second lens 500 is configured not to focus the light but merely to change the direction of the light through the refraction.

In addition, the first and second reflective parts 620' and 630' are formed in the shape of the concave cylinder but have different sizes. That is, since the width of the body part 610 narrows from the first reflective part 620' toward the second reflective part 630', the first and second reflective parts 620' and 630' have different sizes. Here, the focal lines formed by the first and second reflective parts 620' and 630' are formed in the light receiving part 320, and the focal lines formed from the first and second reflective parts 620' and 630' are perpendicular to each other in the light receiving part 320. Thus, the focus of the light reflected from the first and second reflective parts 620' and 630' may be formed on the light receiving part 320.

In other words, the length of the focal line formed in the light receiving part 320 by the first reflective part 620' is gradually reduced after passing through the second reflective part 630', and thus the focus is formed on the light receiving part 320.

A change in shape of the light moving along the second optical axis A2 will be schematically described with reference to FIG. 10.

First, a cross section of the light at a first point P1 of the second optical axis A2, which is located between the second lens 500 and the first reflective part 620', has a first X length x1 and a first Y length y1.

Next, a cross section of the light at a second point P2, which is located between the first and second reflective parts 620' and 630', has a second X length x2 and a second Y length y2. Here, the second Y length y2 becomes shorter than the first Y length y1, and the lengths of the first X length x1 and the second X length x2 are unchanged. That is, the light reflected from the first reflective part 620' is focused along the second optical axis A2 only for the Y length. The light reflected from the first reflective part 620' is focused only for the Y length until the light is guided to the light receiving part 320.

Next, a cross section of the light at a third point P3, which is located between the second reflective part 630' and the light receiving part 320, has a third X length x3 and a third Y length y3. Here, the third X length x3 becomes shorter than the second X length x2. Further, the light reflected from the second reflective part 630' is focused along the second optical axis A2 only for the X length.

Also, the third Y length y3 becomes shorter than the second Y length y2. The reason why the third Y length y3 is shorter than the second Y length y2 is because the focusing is performed by the first reflective part 620'.

As described above, the X length and Y length of the light guided from the second reflective part 630' to the light receiving part 320 are reduced together, and thus the focus is formed on the light receiving part 320.

Referring again to FIG. 9, the distance measuring sensor assembly 1300 is configured as the following Equations 1 and 2:

$$0.8 \times f1 \leq d1 + d2 \leq 1.2 \times f1 \qquad \text{Equation 1}$$

$$0.8 \times f2 \leq d2 \leq 1.2 \times f2 \qquad \text{Equation 2}$$

where, a focal distance of the first reflective part is f1, a focal distance of the second reflective part is f2, a distance from the first reflective part to the second reflective part is d1, and a distance from the second reflective part to the light receiving part is d2.

As described above, the focusing is performed such that the focus of the light reflected from the first and second reflective parts 620' and 630' is formed on the light receiving part 320. Thus, the quantity and density of the light focused on the light receiving part 320 increase, so that accuracy of the distance measuring sensor assembly 1300 may be improved.

Preferably, the distance measuring sensor assembly 1300 is configured as the following Equations 3 and 4:

$$0.9 \times f1 \leq d1 + d2 \leq 1.1 \times f1 \qquad \text{Equation 3}$$

$$0.9 \times f2 \leq d2 \leq 1.1 \times f2 \qquad \text{Equation 4}$$

where, the focal distance of the first reflective part is f1, the focal distance of the second reflective part is f2, the distance from the first reflective part to the second reflective part is d1, and the distance from the second reflective part to the light receiving part is d2.

Further, more preferably, the distance measuring sensor assembly 1300 is configured as the following Equations 5 and 6:

$$f1 = d1 + d2 \qquad \text{Equation 5}$$

$$f2 = d2 \qquad \text{Equation 6}$$

where, the focal distance of the first reflective part is f1, the focal distance of the second reflective part is f2, the distance from the first reflective part to the second reflective part is d1, and the distance from the second reflective part to the light receiving part is d2.

As described above, the light reflected from the first and second reflective parts 620' and 630' is focused on the light receiving part 320 to form a focus. Accordingly, a light gathering power of the optical waveguide part 600 including the first and second reflective parts 620' and 630' is maximized, so that the accuracy of the distance measuring sensor assembly 1300 may be improved.

Table 2 is a simulation result of the fourth embodiment and Comparative Example according to the present invention.

TABLE 2

(Unit: the quantity of light introduced into the light receiving part)

|  | Comparative Example | Fourth Embodiment |
| --- | --- | --- |
| 10 cm | 22 | 53 |
| 20 cm | 5 | 13 |
| 30 cm | 1 | 3 |
| 40 cm | 3 | 8 |

(On the basis of the quantity of light emitted from the light emitting part of 2,000,000)

Table 2 is experimental data in which the quantity of light introduced into the light receiving part 320 is measured in a state in which the quantity of light emitted from the light emitting part 310 is set to 2,000,000.

Comparative Example is a distance measuring sensor assembly in which the optical waveguide part is not provided, Embodiment is the distance measuring sensor assembly 1300 according to the fourth embodiment of the present invention.

As shown in Table 2, when the distance from the distance measuring sensor assembly 1300 to the object T is 30 cm, it may be seen that the quantity of light corresponding to 300% is transmitted from the distance measuring sensor assembly 1300 to the light receiving part 320 in the fourth embodiment as compared with Comparative Example.

In addition, when the distance from the distance measuring sensor assembly 1300 to the object T is 40 cm, it may be seen that the quantity of light of 266.7% is transmitted from the distance measuring sensor assembly 1300 to the light receiving part 320 in the fourth embodiment as compared with Comparative Example.

As described above, it may be seen that the distance measuring sensor assembly 1300 according to the fourth embodiment has a high distance measurement accuracy even when it has a great distance from the distance measuring sensor assembly 1300 to the object T as compared with Comparative Example.

Figure 11:
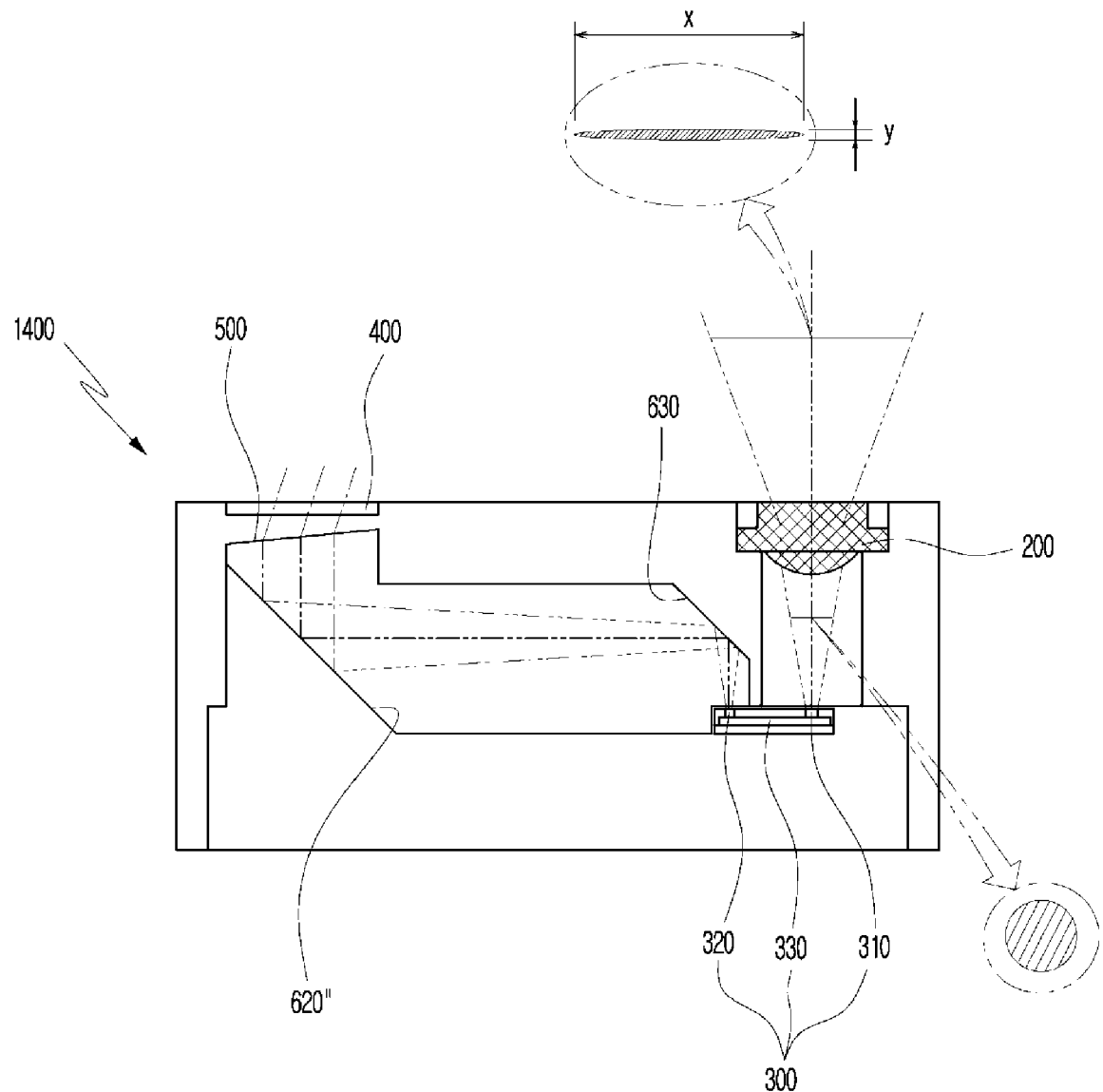
FIG. 11 is a schematic exemplary view of a distance measuring sensor assembly according to a fifth embodiment of the present invention.
Figure 12:
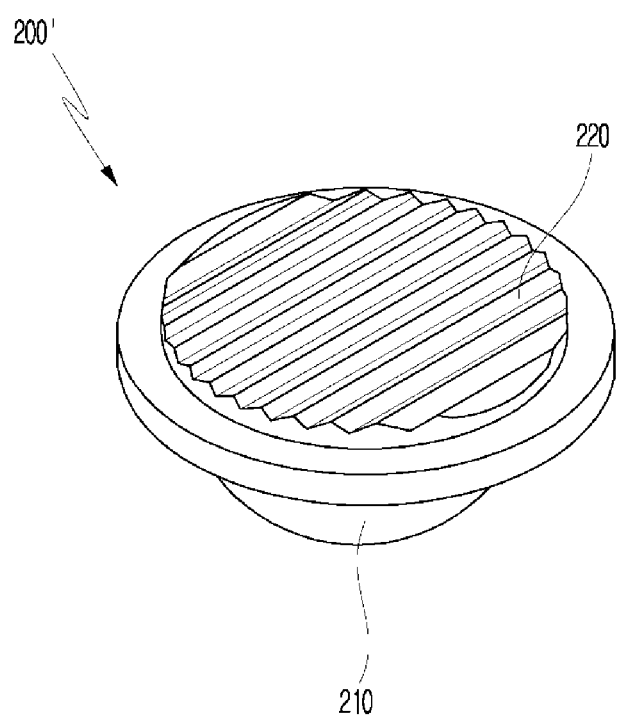
FIG. 12 is a perspective view of a first lens according to the fifth embodiment of the present invention.
Figure 13A:
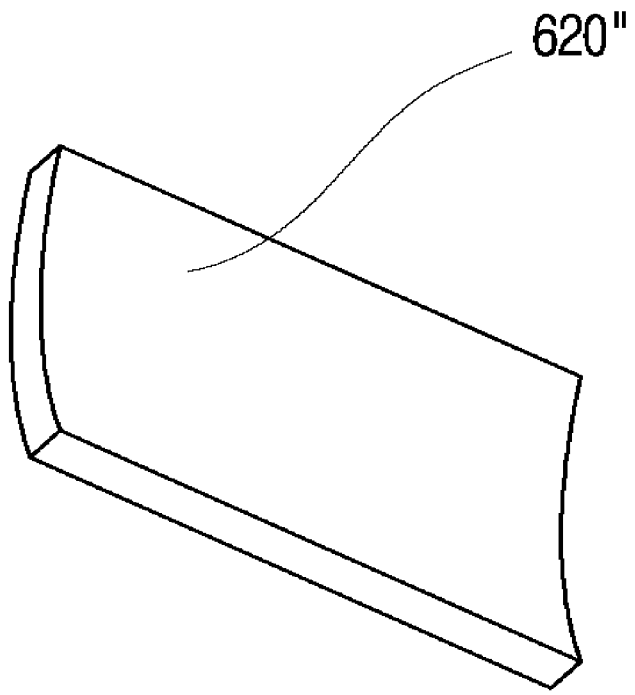
FIG. 13A and FIG. 13B are schematic perspective views illustrating a first reflective part according to the fifth embodiment of the present invention.
Figure 13B:
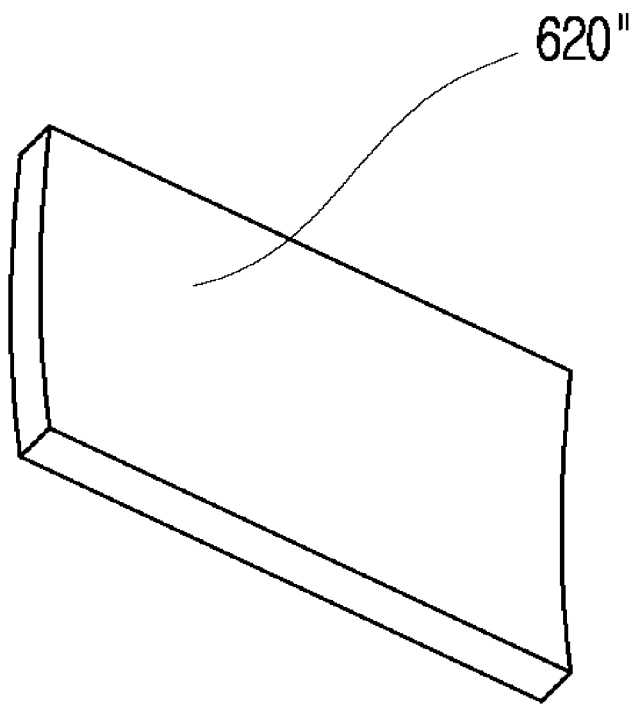
Figure 14A:
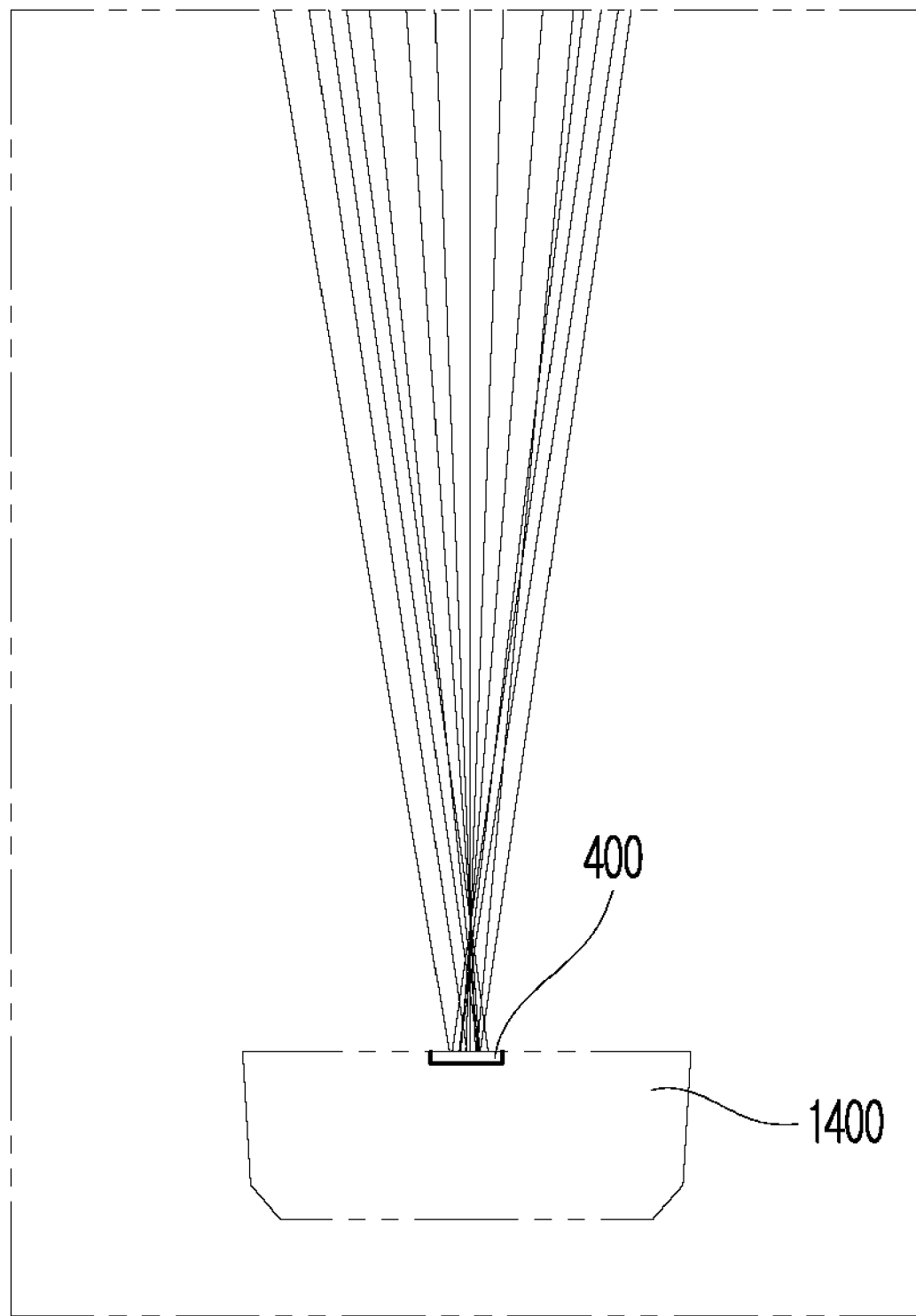
FIG. 14A and FIG. 14B are simulation illustrating lights introduced into a reception part according to the fifth embodiment of the present invention.
Figure 14B:
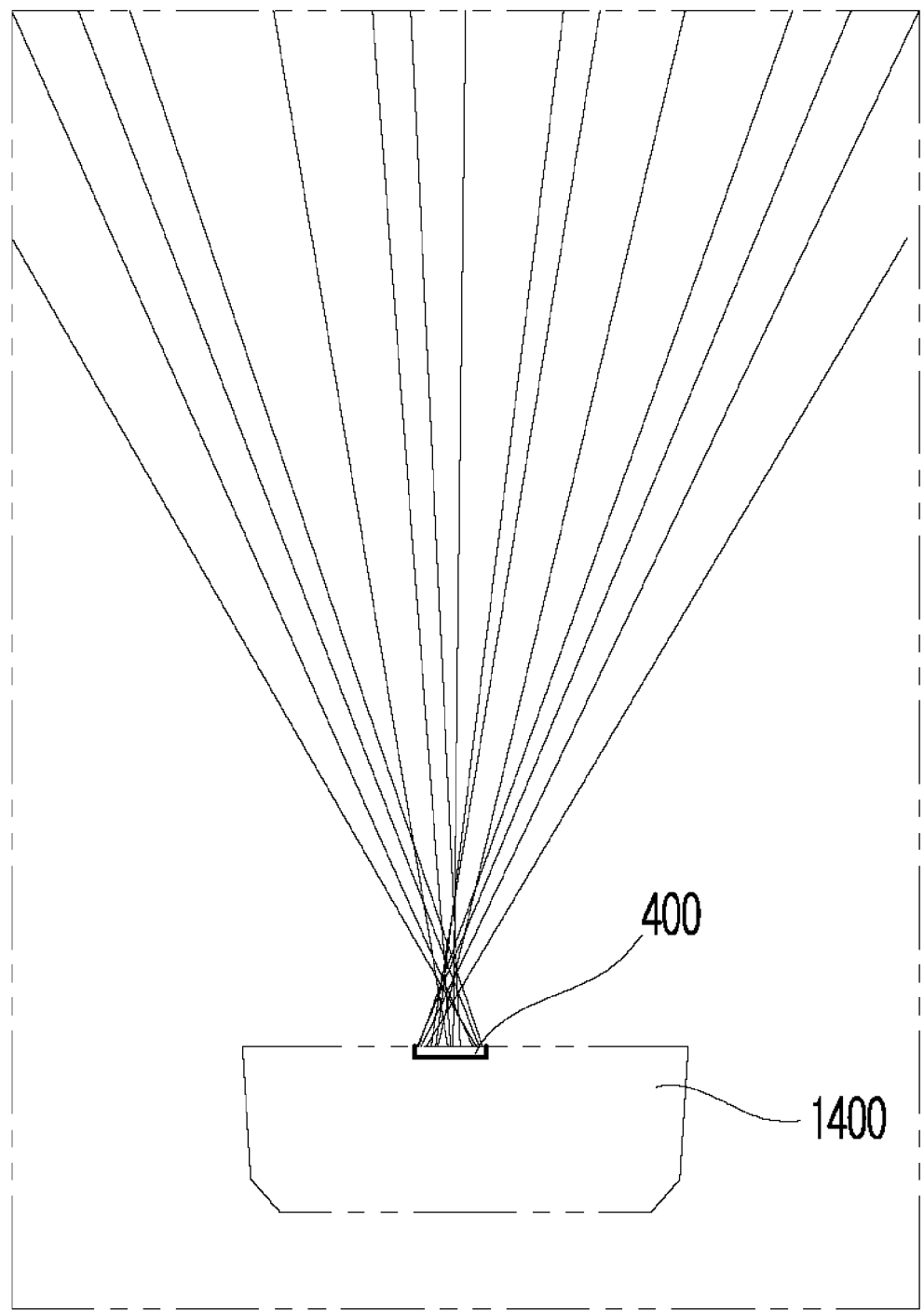

FIG. 11 is a schematic exemplary view of a distance measuring sensor assembly according to a fifth embodiment of the present invention, FIG. 12 is a perspective view of a first lens according to the fifth embodiment of the present invention, FIGS. 13A and 13B are schematic perspective views illustrating a first reflective part according to the fifth embodiment of the present invention, and FIGS. 14A and 14B illustrates simulations of light introduced into a reception part according to the fifth embodiment of the present invention, and the components referred to by the same reference numerals as those shown in FIGS. 3, 3, 5, and 6 have the same functions, and a detailed description thereof will be omitted.

As shown in FIGS. 11 and 12, a distance measuring sensor assembly 1400 according to the fifth embodiment has a more specific first lens 200' as an example.

The first lens 200' includes a light adjusting member 210 and a divergence angle adjusting member 220.

Here, the light adjusting member 210 is provided on a lower part of the first lens 200'. The light adjusting member 210 adjusts the light spreading from the light emitting part 310 in a certain angular range to parallel light. The light adjusting member 210 may be a collimator.

In addition, the divergence angle adjusting member 220 is provided on the light adjusting member 210.

The divergence angle adjusting member 220 spreads the light emitted as the parallel light within a predetermined angle range. Specifically, mountains and valleys are alternately formed on an upper surface of the divergence angle adjusting member 220 so that the light emitted as the parallel light is transmitted through the divergence angle adjusting member 220 while spreading.

In other words, the light emitted toward the object T may be spread only to the X length x of the light in a state in which the Y length y of the light is limited by the divergence angle adjusting member 220. Accordingly, the distance measuring sensor assembly 1400 emits bright light in a range of required divergence angle. Thus, the distance measuring sensor assembly 1400 may accurately measure the distance to the object T.

A first reflective part 620" provided in a concave cylindrical shape in the distance measuring sensor assembly 1400 according to the fifth embodiment will be described as an example.

In FIG. 13A, the first reflective part 620" has a shape in which a curved surface angle thereof is 12°, and in FIG. 13B, the first reflective part 620" has a shape in which the curved surface angle thereof is 6°. That is, an entering angle of the light which is reflected by the object T and introduced into the reception part 400 varies depending on the curved surface angle of the first reflective part 620" in the process of emitting the same light toward the object T.

FIGS. 14A and 14B illustrate the simulation of the light introduced into a reception part 400 according to the curved surface angle of the first reflective part 620". In FIG. 14A, the first reflective part 620" has a shape in which a curved surface angle thereof is 12°, and in FIG. 14B, the first reflective part 620" has a shape in which the curved surface angle thereof is 6°.

As shown in FIGS. 14A and 14B, it may be seen that the entering angle of the light, which is reflected by the object T and introduced to the reception part 400 is greater, in a case in which the curved surface angle of the first reflective part 620" is gently formed at 6° than in a case in which the curved surface angle of the first reflective part 620" is formed at 12°. As described above, the entering angle of the light introduced into the reception part 400 may be selectively adjusted by the curved surface angle of the first reflective part 620".

Accordingly, the distance measuring sensor assembly 1400 may be manufactured in a form of a wide-angle module configured to measure the distance to the object T in a wide angle range or in a form of a long-distance module configured to measure the distance to the remote object T by adjusting the curved surface angle of the first reflective part 620". That is, the distance measuring sensor assembly 1400 may be manufactured in the form of the wide-angle module or the long-distance module, depending on the purpose of use.

Here, the distance measuring sensor assembly 1400 may adjust a field of view (FOV) of a region to be measured by adjusting the shapes of the second lens 500, the second reflective part 630, and the optical waveguide part 600 in addition to the first reflective part 620".

Figure 15:
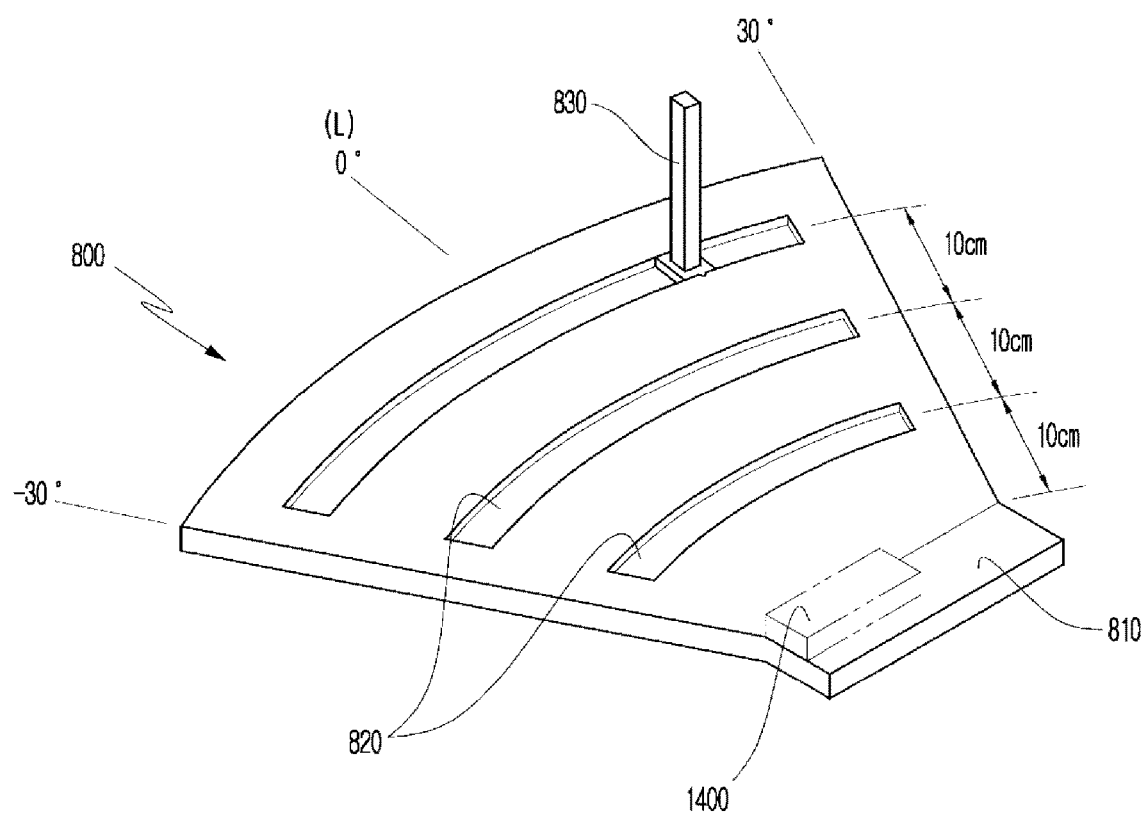
FIG. 15 is an exemplary view illustrating an object measuring apparatus in which the distance measuring sensor assembly according to the fifth embodiment of the present invention is installed.

FIG. 15 is an exemplary view illustrating an object measuring apparatus in which the distance measuring sensor assembly according to the fifth embodiment of the present invention is installed.

Referring to FIG. 15, an object measuring apparatus 800 includes a measuring object installation part 810, a target arrangement part 820, and a target part 830.

The distance measuring sensor assembly 1400 is installed in the measuring object installation part 810. Here, the light emitting part 310 of the distance measuring sensor assembly 1400 is disposed to be aligned with a reference line L which is a center direction of the object measuring apparatus 800.

The target arrangement part 820 is disposed to be spaced apart from the measuring object installation part 810 by a predetermined distance. For example, the target arrangement part 820 may be disposed to be spaced apart from the measuring object installation part 810 at various distances of 10 cm, 20 cm, 30 cm, 40 cm, and the like.

Further, the target arrangement part 820 may have a certain angle range in the clockwise or counterclockwise direction with respect to the reference line L. For example, the target arrangement part 820 may have an angle range of −30° to 30° with respect to the reference line L. The angle range of the target arrangement part 820 is not limited to the angle range of −30° to 30°, and may be variously realized.

Further, the target part 830 is configured to be detachable from the target arrangement part 820. The target part 830 may be installed at various positions of the target arrangement part 820.

Accordingly, the distance measuring sensor assembly 1400 recognizes the target part 830 installed at the various positions of the target arrangement part 820 as the object T and measures the distance to the target part 830. Thus, a user may identify information about a measurable position and distance of the distance measuring sensor assembly 1400 by changing the position of the target part 830.

A distance measuring method of the distance measuring sensor assembly 1400 installed in the object measuring apparatus 800 will be described below. First, the target part 830 is disposed at a position to be measured. For example, the position of the target part 830 in FIG. 15 is 30 cm away from the measuring object installation part 810 and has a point at an angle of 20°.

Next, a value of a quantity of the light which is reflected from the target part 830 and received by the light receiving part 320 is measured through the operation of the distance measuring sensor assembly 1400.

Next, it is determined whether the distance to the target part 830 is measurable through the value of the quantity of the light, which is measured by the light receiving part 320.

Table 3 is a result table of the value of the quantity of the light measured in the distance measuring sensor assembly according to the fifth embodiment of the present invention.

TABLE 3

(Unit of the value of the quantity of the light: mW/sr)

| Divergence angle | Distance measuring sensor assembly in form of wide-angle module Distance from measuring object installation part to target part | | Distance measuring sensor assembly in form of long-distance module Distance from measuring object installation part to target part | |
|---|---|---|---|---|
| | 20 cm | 30 cm | 20 cm | 30 cm |
| −20 | 2.8 | 1.3 | 0 | 0 |
| −15 | 3.1 | 1.9 | 1.3 | 0.3 |
| −10 | 3.7 | 2.5 | 2.7 | 2.0 |
| −5 | 4.1 | 2.9 | 5.5 | 4.6 |
| 0 | 4.3 | 3.1 | 7.2 | 6.8 |
| 5 | 4.0 | 3.0 | 5.8 | 4.9 |
| 10 | 3.9 | 2.6 | 2.9 | 2.3 |
| 15 | 3.2 | 2.0 | 1.4 | 0.6 |
| 20 | 2.9 | 1.7 | 0 | 0 |

Table 3 shows experimental results of the distance measuring sensor assembly 1400 in the form of the wide-angle module, in which the curved surface angle of the first reflective part 620″ is 6°, and the distance measuring sensor assembly 1400 in the form of the long-distance module, in which the curved surface angle of the first reflective part 620″ is 12°.

In this experiment, the distance from the measuring object installation part 810 to the target arrangement part 820 was set to 20 cm and 30 cm, and the divergence angle was set in an angle range of −20° to 20°.

Through such experiments, it is determined that the distance measuring sensor assembly 1400 may not measure an accurate distance for to the object T at the corresponding position when the value of the quantity of the light measured by the light receiving part 320 is less than 1 mW/sr.

As shown in Table 3, in the distance measuring sensor assembly 1400 in the form of the wide-angle module, the value of the quantity of the light of 1 mW/sr or more was measured in angle ranges of the divergence angle of −20° to 20°. That is, it may be seen that the distance measuring sensor assembly 1400 in the form of the wide-angle module may accurately measure the distance for the object T which is 20 cm to 30 cm from the distance measuring sensor assembly 1400 and exists in the angle range of the divergence angle of −20° to 20°.

Further, it may be seen that the distance measuring sensor assembly 1400 in the form of the long-distance module may not accurately measure the distance for the object T which is 20 cm from the distance measuring sensor assembly 1400 and exists in the range of the divergence angle of −20° to 20°.

Further, it may be seen that the distance measuring sensor assembly 1400 in the form of the long-distance module may not accurately measure the distance for the object T which is 30 cm from the distance measuring sensor assembly 1400 and exists in the angle ranges of the divergence angle of −20° to −15° and 15° to 20°.

However, it may be seen that the distance measuring sensor assembly 1400 in the form of the long-distance module has a greater value of the quantity of the light measured at the light receiving part 320 with respect to the center direction, in which the divergence angle is in a range of −5° to 5°, than the distance measuring sensor assembly 1400 in the form of the wide-angle module. Accordingly, the distance measuring sensor assembly 1400 in the form of the long-distance module is effective for measuring the distance for the object T remote from the distance measuring sensor assembly 1400.

The distance measuring sensor assembly according to various embodiments of the present invention may be applied to various electronic devices such as robot cleaners, refrigerators, drones, and the like.

As described above, the distance measuring sensor assembly of the present invention described above is only one preferred embodiment, and the scope of the present invention is not limited by the scope of the description of the embodiments.

The above description of the invention is only exemplary, and it will be understood by those skilled in the art that various modifications can be made without departing from the scope of the present invention and without changing essential features. Therefore, the exemplary embodiments disclosed herein should be considered in an illustrative sense rather than in a restrictive sense. For example, elements described as a single form may be executed while being distributed, and similarly, elements described as being distributed may be executed as being combined.

The above description is only exemplary, and it should be understood by those skilled in the art that the invention may be performed in other concrete forms without changing the technological scope and essential features.

The invention claimed is:

1. A distance measuring sensor assembly comprising:
a housing;
a first lens disposed on an upper part of the housing;
a sensor module of a time of flight (TOF) method which is disposed inside the housing and comprising a light emitting part aligned with the first lens and emitting a light toward an object and a light receiving part disposed adjacent to the light emitting part;
a reception part disposed on the upper part of the housing and spaced apart from the first lens, and into which a portion of the light that is reflected from the object is introduced;
and
an optical waveguide part configured to guide a portion of the light that is transmitted from the reception part to the light receiving part,
wherein the first lens adjusts a divergence angle of the light emitted from the light emitting part,
wherein the optical waveguide part includes:
a first reflective part which receives a portion of the light from the reception part; and
a second reflective part which faces the first reflective part to transmit a portion of the light that is received from the first reflective part to the light receiving part, and
wherein the first reflective part and/or the second reflective part are formed in a curved surface to focus of a portion of the light that is received from the second reflective part on the light receiving part.

2. The distance measuring sensor assembly of claim 1, wherein the first lens comprises:
a light adjusting member configured to adjust the light emitted from the light emitting part to transmit parallel; and
a divergence angle adjusting member disposed on the light adjusting member and configured to spread the light transmitted parallel from the light adjusting member to adjust a divergence angle of the light.

3. The distance measuring sensor assembly of claim 2, wherein mountains and valleys are alternately formed on an upper surface of the divergence angle adjusting member.

4. The distance measuring sensor assembly of claim 1, further comprising a second lens which is provided under the reception part, wherein at least one of the first lens, the second lens, and the optical waveguide part is configured to transmit or reflect only a specific wavelength of the light.

5. The distance measuring sensor assembly of claim 1, further comprising a second lens which is provided under the reception part, wherein the second lens is configured to be integrally coupled to the reception part.

6. The distance measuring sensor assembly of claim 1, further comprising a second lens which is provided under the reception part, wherein an upper surface of the second lens is inclined upward toward the first lens.

7. The distance measuring sensor assembly of claim 1, further comprising a second lens which is provided under the reception part, wherein the second lens comprises an aspherical lens.

8. The distance measuring sensor assembly of claim 1, further comprising a second lens which is provided under the reception part, wherein the second lens comprises a cylindrical lens.

9. The distance measuring sensor assembly of claim 1, wherein an inner surface of the optical waveguide part is configured to allow total reflection.

10. The distance measuring sensor assembly of claim 1, further comprising a second lens which is provided under the reception part, wherein the second lens and the optical waveguide part are configured to focus the portion of the light that is introduced into the reception part on the light receiving part.

11. The distance measuring sensor assembly of claim 1, wherein the first and second reflective parts are formed in a concave cylindrical shape, and focal lines formed by the first and second reflective parts are perpendicular to each other on the light receiving part to form a focus.

12. The distance measuring sensor assembly of claim 11, wherein a distance from the first reflective part to the second reflective part and a distance from the second reflective part to the light receiving part are in relation with the following Equations 1 and 2:

$$0.8 \times f1 \leq d1 + d2 \leq 1.2 \times f1 \qquad \text{Equation 1}$$

$$0.8 \times f2 \leq d2 \leq 1.2 \times f2 \qquad \text{Equation 2}$$

where, a focal distance of the first reflective part is f1, a focal distance of the second reflective part is f2, the distance from the first reflective part to the second reflective part is d1, and the distance from the second reflective part to the light receiving part is d2.

13. The distance measuring sensor assembly of claim 1, further comprising a second lens which is provided under the reception part, wherein the first and second reflective parts are formed in shape configured to focus the portion of the light that is transmitted from the second lens onto the light receiving part.

14. The distance measuring sensor assembly of claim 1, wherein the optical waveguide part narrows in width from the first reflective part toward the second reflective part.

15. An electronic device comprising the distance measuring sensor assembly according to claim 1.